United States Patent
Wang et al.

(10) Patent No.: US 11,604,276 B2
(45) Date of Patent: Mar. 14, 2023

(54) LASER RANGING APPARATUS

(71) Applicants: HANGZHOU GREAT STAR INDUSTRIAL CO., LTD., Hangzhou (CN); HANGZHOU UNITED TOOLS CO., LTD., Hangzhou (CN)

(72) Inventors: Weiyi Wang, Hangzhou (CN); Yueming Li, Hangzhou (CN)

(73) Assignees: HANGZHOU UNITED TOOLS CO., LTD., Hangzhou (CN); HANGZHOU GREAT STAR INDUSTRIAL CO., LTD., Hangzhou (CN)

( * ) Notice: Subject to any disclaimer, the term of this patent is extended or adjusted under 35 U.S.C. 154(b) by 874 days.

(21) Appl. No.: 16/343,665

(22) PCT Filed: Nov. 13, 2017

(86) PCT No.: PCT/CN2017/110715
§ 371 (c)(1),
(2) Date: Apr. 19, 2019

(87) PCT Pub. No.: WO2019/090771
PCT Pub. Date: May 16, 2019

(65) Prior Publication Data
US 2021/0356586 A1 Nov. 18, 2021

(51) Int. Cl.
*G01C 3/08* (2006.01)
*G01S 17/08* (2006.01)
(Continued)

(52) U.S. Cl.
CPC ............ *G01S 17/08* (2013.01); *G01S 7/4813* (2013.01); *G01S 7/4814* (2013.01); *G01S 7/51* (2013.01); *G06F 3/14* (2013.01)

(58) Field of Classification Search
CPC ...... G01S 17/08; G01S 7/4813; G01S 7/4814; G01S 7/51; G01S 7/481; G06F 3/14
(Continued)

(56) References Cited

U.S. PATENT DOCUMENTS 6,324,888 B1   12/2001   Schmidt et al.
9,151,603 B2   10/2015   Dunne
(Continued)

FOREIGN PATENT DOCUMENTS

CN   201181332 Y   1/2009
CN   102362195 A   2/2012
(Continued)

OTHER PUBLICATIONS

CNIPA; Application No. CN201721507085.8, Examination Decision of Request for Invalidation (No. 44019) dated Apr. 20, 2020.
(Continued)

*Primary Examiner* — Md M Rahman
(74) *Attorney, Agent, or Firm* — Fitch, Even, Tabin & Flannery LLP (57) ABSTRACT

The present invention provides a laser ranging apparatus, including: a holder, a measuring part mounted to the holder, and a housing detachably connected to the holder, wherein the housing includes a first casing. The first casing is an integrally formed tubular structure detachably sleeved outside the holder. An advantage of the present invention is to provide a laser ranging apparatus for fixedly mounting a measuring component on a holder and installing a detachable casing on the outside of the holder so as to ensure that the position of the measuring component will not be moved during the disassembly and assembly of the casing and the ranging precision of the measuring part will not be affected. The casing is composed of several simple components, which can effectively reduce the process difficulty of the
(Continued)

casing parts. Meanwhile, the assembly and disassembly of the casing are simple and convenient, the production efficiency is increased effectively, the production cost is reduced, and the productivity is increased. The laser ranging apparatus has a smaller size, compact structure, less space occupied, easy for users to carry, and good anti-shock performance and hand feeling.

16 Claims, 9 Drawing Sheets

(51) Int. Cl.
    *G01S 7/481*     (2006.01)
    *G01S 7/51*     (2006.01)
    *G06F 3/14*     (2006.01)

(58) Field of Classification Search
    USPC .......................................................... 356/4.01
    See application file for complete search history.

(56) References Cited

U.S. PATENT DOCUMENTS

| | | | |
|---|---|---|---|
| 9,268,011 | B2 | 2/2016 | Wolf et al. |
| 2010/0271814 | A1 | 10/2010 | Messinger |
| 2012/0069457 | A1 | 3/2012 | Wolf et al. |
| 2015/0355328 | A1 | 12/2015 | Maryfield |

FOREIGN PATENT DOCUMENTS

| | | |
|---|---|---|
| CN | 303152602 S | 4/2015 |
| CN | 104597437 A | 5/2015 |
| CN | 105526513 A | 4/2016 |
| CN | 105526514 A | 4/2016 |
| CN | 205193281 U | 4/2016 |
| CN | 105954756 A | 9/2016 |
| CN | 206002691 U | 3/2017 |
| CN | 304269870 S | 9/2017 |
| EP | 1503221 A1 | 2/2005 |
| GB | 2213018 A | 8/1989 |
| JP | H067445 A | 1/1994 |
| JP | 2012525115 A | 10/2012 |
| WO | 2010108705 A1 | 9/2010 |

OTHER PUBLICATIONS

CNIPA; Application No. CN201721507085.8 Examination Decision of Request for Invalidation (No. 45739) dated Aug. 12, 2020.
App. No. PCT/CN2017/110715; International Search Report dated Jul. 5, 2018.
CNIPA/SIPO; Chinese Application No. 20172157085.8; Examination Decision of Request for Invalidation (No. 59432), dated Dec. 12, 2022 (14 pages).
SIPO; Chinese Application No. 201721507085.8; Examination Decision Exhibit 7; Notarial certificate of Shenzhen Character No. 62098 (2021) and its attachments, involving the evidence preservation of the website content of JD Finance's crowd-funding project "replacing the tape measure millimeter skyscraper laser" (25 pages).
SIPO; Chinese Application No. 201721507085.8; Examination Decision Exhibit/Evidence 8; Trusted time stamp authentication certificate (TSA-01-20210531100814015ds3Q9n, TSA-01-20210531101033489​8v3n8X) and its original and accessories (the article "Measuring precision small Instrument" published on Sep. 14, 2017 on wechat official account "Billwang Industrial Design" is subject to credible time stamp forensics curing preservation) (18 pages).
SIPO; Chinese Application No. 201721507085.8; Examination Decision Exhibit/Evidence 9; Trusted time stamp authority authentication certificate (TSA-01-202105311017384774tR6dz, TSA-01-20210531101858665qxa24s) and its attachments of the original (the article "Very yellow and very violent skyscraper laser ruler m1" published by user "Curry" on Jiguo network in 2017 was subject to credible time intercepting forensics curing preservation) (22 pages).
SIPO; Chinese Application No. 201721507085.8; Examination Decision Exhibit 10; Trusted time stamp authentication certificate (TSA-01-20210531102520496v79R93, TSA-01-20210531102708966​1894tl) and its attachments issued by the Joint Trust Time Stamp Service Center, which relates to the user's "love to eat the seed . . . " (the video "The small artifact that replaces the tape measure—Skyscraper Laser ruler" released on iQiyi on Mar. 7, 2017 carries out credible time stamp forensics curing preservation) (16 pages).
SIPO; Chinese Application No. 201721507085.8; Examiantion Decision Exhibit/Evidence 11; Notarial certificate of Shenzhen No. 62097 (2021) and its attachments, involving the on-site delivery process of Yunda Express package (tracking No. 4314786004771) and the evidence preservation of the obtained documents of goods (23 pages).
SIPO; Chinese Application No. 201721506085.8; Examination Decision Exhibit/Evidence 12; Trusted time stamp authentication certificate(TSA-01-20210531113314326TC4000, TSA-01-20210531113543836dA5z7x) and its original and accessories (it involves making reliable time-stamp foresnics and curing preservation of the shop information, order detail and chat records with the customer service about the antenna laser rangefinder purchased by the user "Thorn Bird got a good score" at the flagship shop of myantenna on Taobao.com) (17 pages).
SIPO; Chinese Application No. 201721507085.8; Examination Decision Exhibit 13; Shenzhen VAT Electronic ordinary invoice, invoice code is 0444032000211, invoice number is 74229807, invoice date is May 31, 2021, and the buyer's name is Shenzhen Yishui Electronic Technology Co., LTD. (the name of the good is "geodetic instrument yantenna laser rangefinder measuring room instrument high precision laser ruler mini electronic ruler Measuring ruler", the seller's name is Shenzhen Skyflyer Radio Frequency Technology Co., LTD.) (1 page).
SIPO; Chinese Application No. 201721507085.8; Examination Decision Exhibit/Evidence 14; No. 36818 Invalidation Request Review decision made by the State Intellectual Property Office (14 pages).

LASER RANGING APPARATUS

CROSS-REFERENCE TO RELATED APPLICATIONS

This application is a U.S. national phase application of International Application No. PCT/CN2017/110715, filed Nov. 13, 2017, designating the United States.

FIELD OF THE INVENTION

The present invention relates to the field of measuring tools and, in particular to a laser ranging apparatus.

DESCRIPTION OF THE PRIOR ART

Laser range finder is a common non-contact ranging tool and can be used in construction, interior decoration, traffic accident handling and other fields. The laser range finder of the prior art generally integrates a core assembly directly into a casing. The core assembly of the laser range finder is a precision component requiring high precision in the assembly process. The manufacture or maintenance of the laser range finder needs to be performed by professionals, and each assembly needs testing and precision adjustment to ensure the ranging precision in use, which is low in product production efficiency and troublesome in rework operations. Because ordinary users have difficulties in performing precision testing and adjustment, the laser range finder cannot be disassembled and repaired by ordinary users. Otherwise, the ranging precision will be affected and the error will be larger.

In addition, the core assembly and other components of the laser range finder are mostly irregular shape components, and the casing needs to be arranged with a plurality of part mounting grooves, so that the shapes thereof are suitable for various components. The production process of the casing is complicated, the production cost is high, the production efficiency is low, and the productivity is limited to a certain extent.

SUMMARY OF THE INVENTION

An objective of the present invention is to provide a laser ranging apparatus which solves the problems of inconvenient assembly of the casing, complex process of the casing, high production cost and low production efficiency of the laser ranging apparatus in the prior art.

In order to solve the above technical problem, the present invention provides a laser ranging apparatus, including: a holder, a measuring part mounted to the holder, and a housing detachably connected to the holder, wherein the housing includes a first casing, the first casing is an integrally formed tubular structure detachably sleeved outside the holder.

Further, in various embodiments, the housing further includes a second casing and a third casing respectively detachably connected to two ends of the first casing.

Further, in various embodiments, two ends of the first casing are respectively provided with a first opening and a second opening; the second casing is detachably mounted to the first opening of the first casing; one end of the holder is inserted into the first casing via the second opening, the other end of the holder extends to the outside of the second opening, and is detachably connected to the third casing.

Further, in various embodiments, the laser ranging apparatus further includes a groove provided on an outer sidewall of the holder; and a rib protruding from an inner sidewall of the first casing and slidably inserted into the groove.

Further, in various embodiments, the shape of the holder is elongated, and the shape of the housing is a straight cylinder.

Further, in various embodiments, the holder includes a first mounting groove disposed opposite to the second casing, and a second mounting groove disposed opposite to the third casing.

Further, in various embodiments, the laser ranging apparatus further includes a display device mounted to the holder; and a button switch mounted to the holder, wherein the display device and the button switch are connected to the measuring part and/or at least one battery through wires.

Further, in various embodiments, the holder includes a third mounting groove recessed on a sidewall of the holder for mounting the display device; and a fourth mounting groove recessed on a sidewall of the holder for mounting the button switch; the first casing includes a first casing body; a first groove recessed on a surface of one side of the first casing body; a first through hole penetrating through a bottom surface of the first groove and disposed opposite to the display device; and a second through hole penetrating the bottom surface of the first groove and being penetrated by a portion of the button switch.

Further, in various embodiments, the laser ranging apparatus further includes a transparent cover mounted in the first groove and having a portion disposed opposite to the first through hole; and a cover through hole penetrating one end of the transparent cover and disposed opposite to the second through hole; and the second through hole and the cover through hole are sequentially penetrated by a portion of the button switch.

Further, in various embodiments, the measuring part includes a laser generating device having a first laser port facing the first opening of the first casing; and a photoelectric conversion device having a second laser port facing toward the first opening of the first casing; and the second casing includes a second casing body; a third through hole penetrating through the second casing body and disposed opposite to the first laser port; and a fourth through hole penetrating the second casing body and disposed opposite to the second laser port.

Further, in various embodiments, the second casing includes a first locking block protruding from a surface of one side of the second casing body and locked into the first opening of the first casing; a bayonet provided on the first locking block; one end of the rib of the first casing being detachably locked into the bayonet; a second groove surrounded and formed by the first locking block and the second casing body, and a front end of the measuring part being inserted into the second groove.

Further, in various embodiments, the laser ranging apparatus further includes a holder screw hole disposed at a front end of the holder and disposed opposite to the second casing; and a fifth through hole penetrating through the second casing body and disposed opposite to the holder screw hole; and a screw connected to the holder screw hole through the fifth through hole.

Further, in various embodiments, the laser ranging apparatus further includes a locking groove provided on an inner front wall of a front end of the first casing or the front end of the holder; and a second locking block protruding from a surface of one side of the second casing body and locked into the locking groove.

Further, in various embodiments, the third casing includes a third casing body; a third groove provided on one side of the third casing body with a notch direction facing the first casing body; and an elastic member having one end connected to the bottom of the third groove and the other end connected to a battery in the holder.

Further, in various embodiments, the third casing includes a third casing body; a third groove provided on one side of the third casing body with a notch direction facing the first casing; a second battery detachably mounted in the third groove having one end connected in series to the battery in the holder; and an elastic member having one end connected to the bottom of the third groove and the other end connected to the second battery.

Further, in various embodiments, the laser ranging apparatus further includes a female connector provided at the notch of the third groove; a male connector protruding from one end of the holder and detachably connected to the female connector; and a connector cavity disposed in the male connector and communicating with the second mounting groove.

Further, in various embodiments, the laser ranging apparatus further includes a sheath covering an outer surface of the housing partially or entirely.

Another objective of the present invention is to provide a laser ranging apparatus, so as to solve the problems of the prior art laser ranging apparatus such as large volume, large occupied space and inconvenient portability.

In order to solve the above technical problem, the present invention provides a laser ranging apparatus comprising a housing; the shape and size of two or more cross-sections of the housing are the same; and the cross-sectional shape of the housing includes a circle, an ellipse, a rounded triangle, a rounded rectangle or a rounded polygon.

Further, in various embodiments, the housing has a cross-sectional height in the range of 14~22 mm; and the housing has a cross-sectional width in the range of 18~25 mm.

Further, in various embodiments, when the cross-section of the housing is circular, the diameter of the cross-section of the housing in the range of 18~28 mm; and when the cross-section of the housing is an oval, a rounded triangle, a rounded rectangle or a rounded polygon, the diameter of the inscribed circle of the cross section of the housing is in the range of 18~20 mm and the diameter of the circumscribed circle in the cross section of the housing is in the range of 20~28 mm.

Further, in various embodiments, the laser ranging apparatus further includes a measurement display part composed of a measurement part and a display device; the cross-sectional height of the measurement display part is in the range of 10~12 mm; the cross-sectional width of measurement display part is in the range of 15~17 mm; and the length of the measurement display part is in the range of 39~45 mm.

Further, in various embodiments, the ratio of the cross-sectional width of the measurement display part to the cross-sectional width of the housing is in the range of 0.6~0.8; the ratio of the cross-sectional height of the measurement display part to the cross-sectional height of the housing is in the range of 0.6~0.8; and the ratio of a cross-sectional area of the measurement display part to the cross-sectional area of the housing is in the range of 0.67~0.8.

Further, in various embodiments, the laser ranging apparatus further includes a battery disposed in the housing; the battery includes a button battery or a columnar battery; when the battery is a button battery, the length of the housing is in the range of 60~70 mm; and when the battery is a cylindrical battery, the length of the housing is in the range of 95~150 mm.

Further, in various embodiments, the material of the housing is aluminum alloy, plastic, nylon material or carbon fiber material.

An advantage of the present invention is to provide a laser ranging apparatus for fixedly mounting a measuring component on a holder and installing a detachable casing on the outside of the holder so as to ensure that the position of the measuring component will not be moved during the disassembly and assembly of the casing and the ranging precision of the measuring part will not affected. The casing of the laser ranging apparatus is composed of several components of simple shapes, which can effectively reduce the process difficulty of the casing components. Meanwhile, the assembly and disassembly of the casing are simple and convenient, the production efficiency is improved, the production cost is reduced, and the productivity is increased. The laser ranging apparatus has a smaller size, compact structure, less space occupied, easy for users to carry, and good anti-shock performance and hand feeling.

REFERENCE SIGNS

1 holder, 2 measuring part, 3 housing, 4 battery, 5 display device, 6 button switch;

7 sheath, 8 second battery;

11 first mounting groove, 12 second mounting groove, 13 third mounting groove, 14 fourth mounting groove, 15 groove;

16 male connector, 17 connector cavity, 18 holder screw hole;

21 core assembly, 22 laser generating device, 23 photoelectric conversion device;

31 first casing, 32 second casing, 33 third casing, 34 transparent cover, 35 first opening, 36 second opening, 37 holder baffle, 38 screw;

61 switch base, 62 buttons, 63 switch contacts;

121 metal contacts, 122 metal ring, 123 bus;

221 first laser port, 222 second laser port;

311 rib, 312 first groove, 313 first through hole, 314 second through hole, 321 second casing body, 322 third through hole, 323 fourth through hole, 324 first locking block, 325 second groove, 326 bayonet, 327 locking groove, 328 second locking block, 329 fifth through hole;

331 third casing body, 332 third groove, 333 elastic member, 334 female connector, 341 cover through hole

DETAILED DESCRIPTION OF THE PREFERRED EMBODIMENTS

The preferred embodiments of the present invention are described below with reference to the accompanying drawings, so as to be completely described to those skilled in the art, and its technical content will be clearer and easier to be understood. The present invention can be embodied in many different forms of embodiments, and the protection scope of the present invention is not limited to the embodiments mentioned herein.

In the accompanying drawings, structurally identical components are designated by the same reference numerals, and structurally or functionally similar components throughout drawings are marked with similar reference numerals. The directional terms referred to in the present invention, such as "up", "down", "front", "rear", "left", "right," "inside", "outside", and "side" are merely the directions in the drawings and are used for illustrating and describing the the present invention, but not intended to limit the protection scope of the present invention.

When a certain component is described as being "on" another component, the component may be placed directly on the other component; or there may be an intermediate component on which the component is placed, and the intermediate component is placed on the other component. When a component is described as "mounted to" or "connected to" another component, both can be understood as being directly "mounted" or "connected," or a component may be indirectly "mounted to" or "connected to another component via an intermediate component.

Embodiment 1

As shown in FIGS. 1-4, the present embodiment provides a laser ranging apparatus, which comprises a holder 1, a measuring part 2 and a housing 3. The measuring part 2 is fixedly connected to the holder 1. The housing 3 is detachably connected to the holder 1. The housing 3 covers the holder 1 and the measuring part 2. There is a gap between the housing 3 and the measuring part 2. In the present embodiment, the direction in which the measurement part 2 is located is the front end. During the process of disassembling/assembling the housing 3 from/to the holder 1, there is always a gap between the housing 3 and the measuring part 2, and no contact therebetween occurs.

Figure 5:
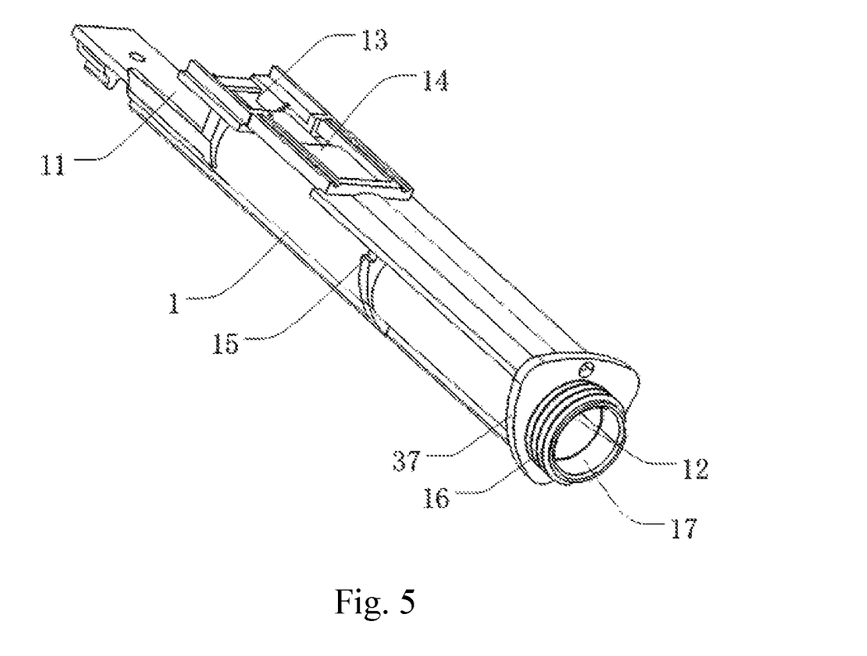
FIG. 5 is a structural diagram of a holder in embodiment 1 of the present invention.

As shown in FIG. 5, the holder 1 includes a first mounting groove 11, a second mounting groove 12, a third mounting groove 13, and a fourth mounting groove 14. The first mounting groove 11 is disposed on the front end of the holder 1, and the second mounting groove 12 is disposed on the rear end of the holder 1. The third mounting groove 13 and the fourth mounting groove 14 are arranged in parallel on a sidewall of the holder 1.

Figure 6:
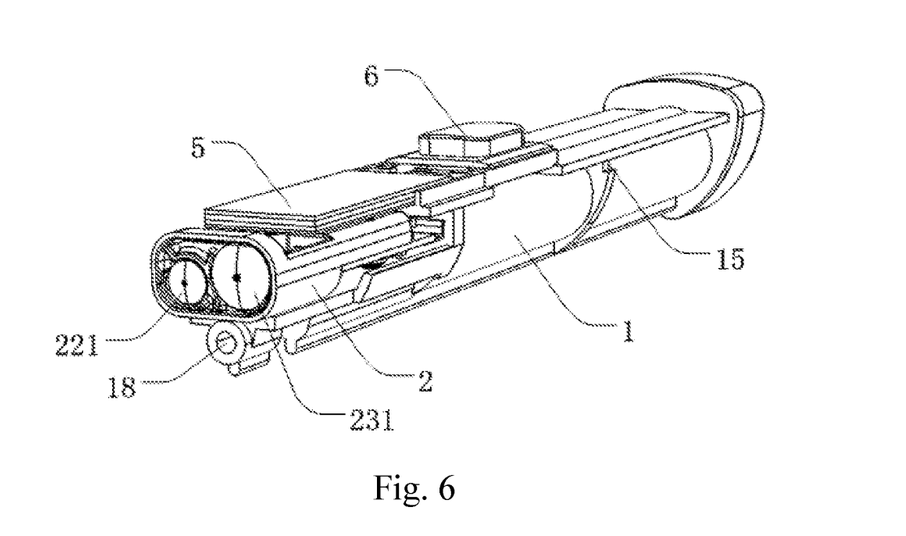
FIG. 6 is a structural diagram of embodiment 1 of the present invention after removing the housing.

As shown in FIG. 6, the measuring part 2 is fixedly mounted in the first mounting groove 11, and the shape of the first mounting groove 11 is adapted to the measuring part 2. The measuring part 2 comprises a laser range finder core assembly 21, which comprises a laser generating device 22 and a photoelectric conversion device 23, both of which are arranged at the front end of the holder 1 and lie on the same plane.

As shown in FIGS. 1-6, this embodiment further includes a battery 4, a measuring part 2, a display device 5, and a button switch 6.

Figure 1:
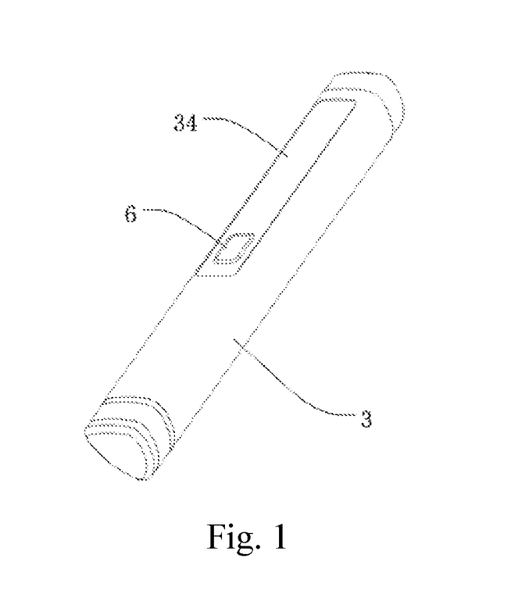
FIG. 1 is a schematic diagram of an overall structure of embodiment 1 of the present invention.
Figure 2:
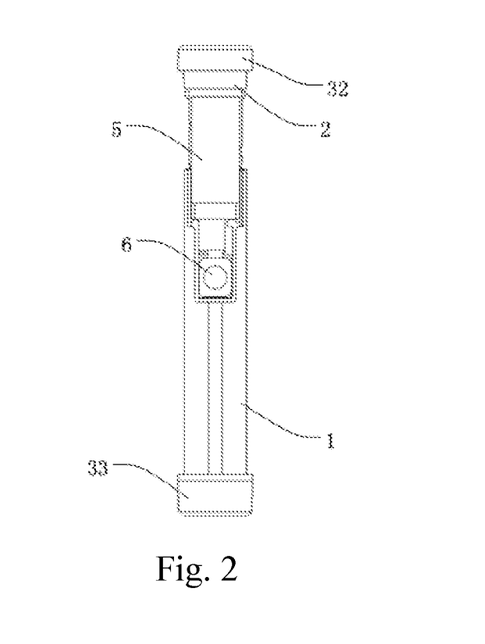
FIG. 2 is a front structural diagram of embodiment 1 of the present invention after removing the first casing.
Figure 3:
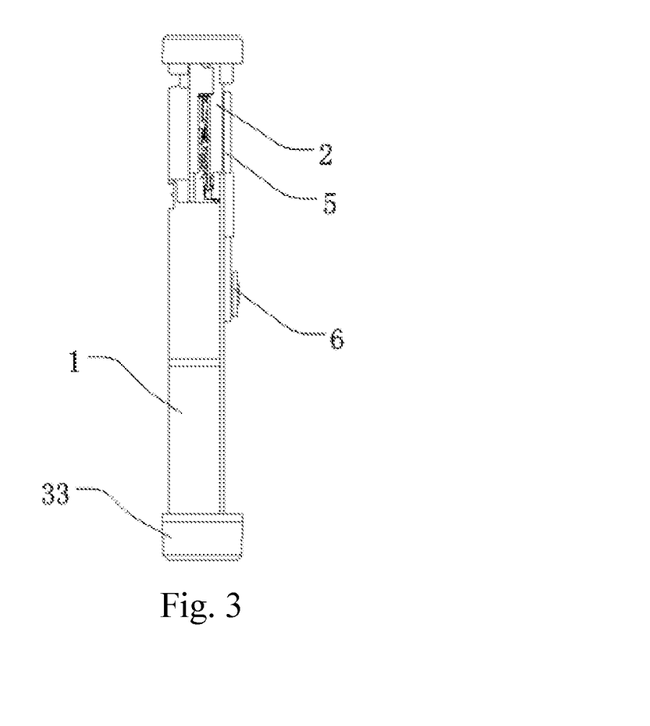
FIG. 3 is a left structural diagram of embodiment 1 of the present invention after removing the first casing.
Figure 4:
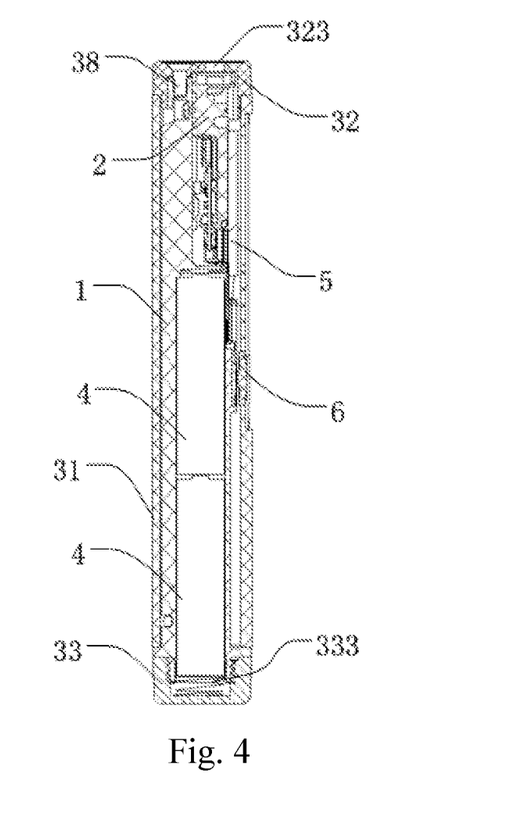
FIG. 4 is a cross-sectional structural diagram of embodiment 1 of the present invention.

As shown in FIG. 4, the battery 4 is used to supply power to the display device 5. In this embodiment, two columnar batteries in series are preferably detachably mounted in the second mounting groove 12. The second mounting groove 12 has a shape adapted to that of the battery pack. In other embodiments, one or more columnar batteries or button batteries may also be selected.

As shown in FIGS. 5 to 6, the display device 5 is disposed in the third mounting groove 13 and connected to the measuring part 2 or the battery 4 through wires. The display device 5 is preferably an liquid crystal display (LCD) screen for displaying the distance reading measured by the core assembly 21. The shape of the third mounting groove 13 is adapted to that of the housing of the display device 5, and the LCD screen faces outwards.

The button switch 6 is disposed in the fourth mounting groove 14 and connected to the measuring part 2 or the battery 4 through wires. The shape of the fourth mounting groove 14 is adapted to that of the housing of the display device 5. When the button switch 6 is pressed, the battery 4 supplies power to the measurement part 2 and the display device 5. The display device 5 and the button switch 6 are arranged side by side, which is convenient for the user to control and read the indication.

Figure 7:
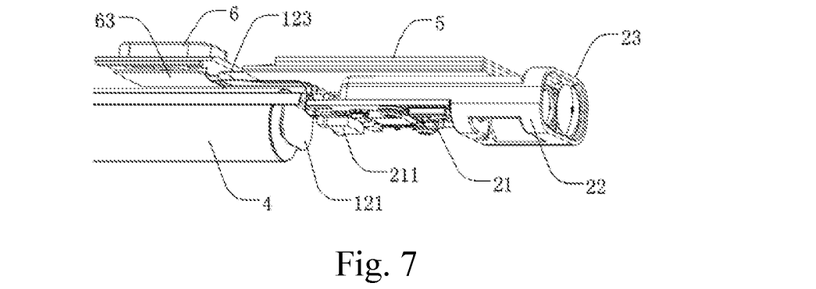
FIG. 7 is a structural diagram of a measuring part in embodiment 1 of the present invention after removing the housing.
Figure 8:
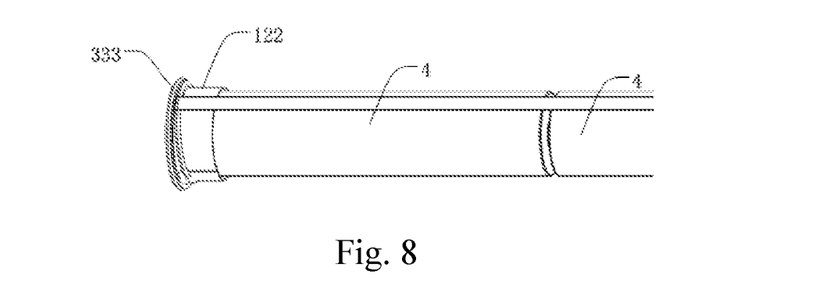
FIG. 8 is a structural diagram of a battery portion in embodiment 1 of the present invention after removing the housing.

As shown in FIGS. 7 to 8, the front end of the second mounting groove 12 is provided with a metal contact 121 electrically connected to the positive pole of the columnar battery 4. A metal ring 122 is disposed at the rear end of the second mounting groove 12 and sleeved on the outside of the columnar battery 4 and electrically connected to the negative pole of the columnar battery 4. The core assembly 21 is provided with a power supply module 211. The metal contact 121 and the metal ring 122 are specially shaped wires directly or indirectly electrically connected to the power supply module 211 and the battery 4 for powering the core assembly 21. The power supply module 211 is electrically connected to the display device 5 through a bus 123 for supplying power to the LCD screen. The button switch 6 is electrically connected to the power supply module 211 and/or the battery 4 through wires to control on/off of the measuring part 2 and the display device 5.

As shown in FIGS. 6 to 7, when the button switch 6 is pressed in working state, the measuring part 2 and the display device 5 are simultaneously powered, and the laser generating device 22 emits a laser beam to irradiate an object to be measured. Light rays are reflected by the surface of the object and irradiated to the photoelectric conversion device 23 so that the distance between the reference point of the measuring part 2 and the object to be measured is calculated and displayed on the display device 5 so that the user can read the indication.

As shown in FIG. 4, the housing 3 includes a first casing 31, a second casing 32, and a third casing 33. The second casing 32 is detachably connected to the front end of the first casing 31, and the third casing 33 is detachably connected to the rear end of the first casing 31. The second casing 32 is disposed opposite to the first mounting groove 11 on which the measuring part 2 is mounted, and the third casing 33 is disposed opposite to the second mounting groove 12 on which the battery 4 is mounted.

Figure 9:
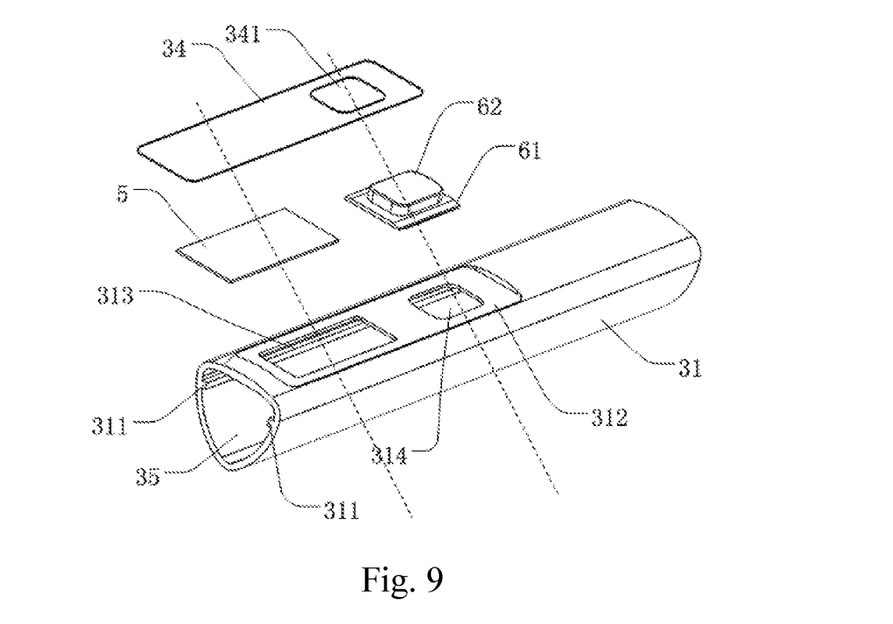
FIG. 9 is an exploded structural diagram of a first casing and a display device in embodiment 1 of the present invention.

As shown in FIGS. 4-5 and FIG. 9, the first casing 31 is an integrally formed tubular structure, and has a cylindrical cavity therein, and the first casing 31 is sleeved outside the holder 1. Both ends of the first casing 31 are respectively provided with a first opening 35 and a second opening 36. The cross-sectional shapes and the sizes of the first opening 35 and the second opening 36 are all consistent with the cross-sectional shape and size of the inner wall of the first casing. The second casing 32 is detachably mounted to the first opening 35. A holder baffle 37 is disposed at the rear end of the holder 1 and has the same shape as or corresponds to the cross-section of the outer wall of the first casing 31. The front end of the holder 1 is inserted into the first casing 31 through the second opening 36, and the rear end thereof extends to the outside of the second opening 36 and is detachably connected to the third casing 33.

The holder 1 further comprises two oppositely disposed grooves 15 provided on the outer sidewall of the holder 1. The inner sidewall of the first casing 31 is provided with two ribs 311 protruding inwardly and oppositely. When the front end of the holder 1 is inserted into the first casing 31 via the second opening 36, the ribs 311 are slidably inserted into the groove 15, and the holder baffle 37 and the edge of the second opening 36 are oppositely disposed and abutted with each other. Meanwhile, the second casing 32 is fixed to the other end of the holder 1 through the first opening 35. The first casing 31 is sandwiched between the holder baffle 37 and the second casing 32, so that the first casing 31 and the holder 1 are relatively fixed.

As shown in FIG. 9, the first casing 31 includes a first groove 312, a first through hole 313, and a second through hole 314. The first groove 312 is recessed on a surface of one side of the first casing 31; the position of the first groove 312 on the first casing 31 corresponds to the display device 5 and the button switch 6 on the holder 1. The first through hole 313 and the second through hole 314 respectively penetrate the bottom surface of the first groove 312, and the first through hole 313 is disposed opposite to the display device 5; a portion of the button switch 6 penetrates through the second through hole 314 so that the display device 5 and the button switch 6 can be exposed to the same side of the surface of the first casing 31 for user's operation. In other embodiments of the present invention, the display device 5 and the button switch 6 may be disposed outside the first casing 31. The first casing 31 only needs to have a through hole through which the connecting wire can pass.

This embodiment further includes a transparent cover 34 mounted in the first groove 312. The transparent cover 34 has a portion disposed opposite to the first through hole 313, and the transparent cover 34 protects the display device 5. The user can read the indication of the display device 5 through the transparent cover 34.

As shown in FIGS. 5 and 9, one end of the transparent cover 34 is provided with a cover through hole 341 disposed opposite to the second through hole 314. The button switch 6 includes an integrally formed switch base 61 and a button 62. The switch base 61 is disposed in the fourth mounting groove 14. The button 62 sequentially penetrates through the second through hole 314 and the cover through hole 341 to be exposed to the outside of the first casing 31, easy for users to press. A switch contact 63 is disposed under the switch base 61 and electrically connected to the power supply module 211 of the measuring part 2. When the button 62 is pressed, the battery 4 can be controlled to power on or off the measuring part 2 and the display device 5.

Figure 10:
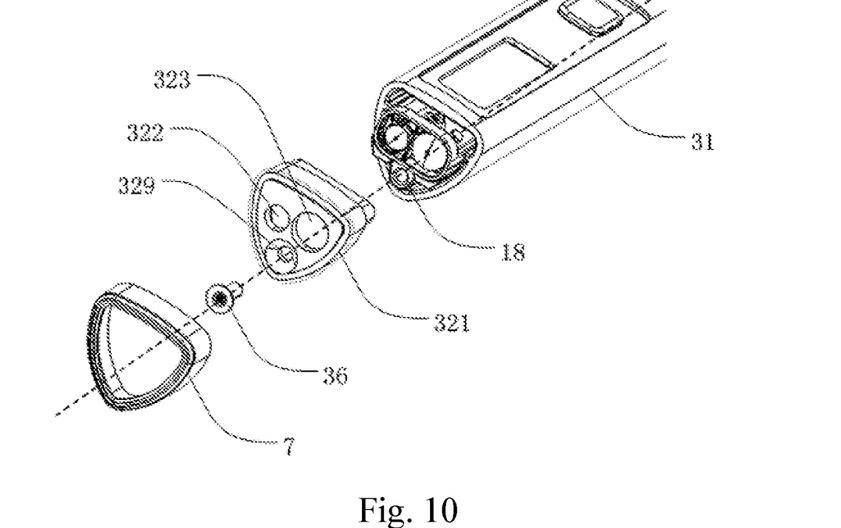
FIG. 10 is an exploded structural diagram of a second casing and the first casing in embodiment 1 of the present invention.
Figure 11:
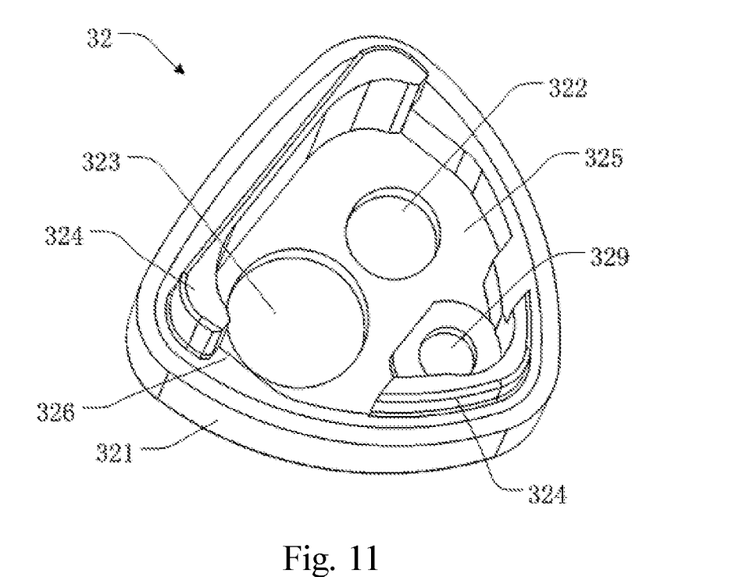
FIG. 11 is a structural diagram of the second casing in embodiment 1 of the present invention.

As shown in FIGS. 10 to 11, in the present embodiment, the second casing 32 includes a second casing body 321, a third through hole 322, and a fourth through hole 323.

The laser generating device 22 of the measurement part 2 is provided with a first laser port 221 facing the first opening 25. The photoelectric conversion device 23 is provided with a second laser port 222 also facing the first opening 25. The third through hole 322 penetrates the second casing body 321 and is disposed opposite to the first laser port 221. The fourth through hole 323 penetrates the second casing body 321 and is disposed opposite to the second laser port 222. The third through hole 322 and the fourth through hole 323 are used to provide a passage for the laser beam to ensure that the laser beam emitted by the laser generating device 22 can irradiate the object to be measured and the reflected beam can irradiate the photoelectric conversion device 23.

The second casing 32 includes a first locking block 324 protruding from a surface of one side of the second casing body 321. The first locking block 324 is an annular locking block and is made of elastic material. The first locking block 324 is locked into the first opening 35 at the front end of the first casing 31. The cross-sectional shape of the outer wall of the first locking block 324 is adapted to the cross-section shape of the inner wall of the first casing 31. A second groove 325 is formed in a region surrounded by the first locking block and the second casing body 321. The laser generating device 22 and the photoelectric conversion device 23 at the front end of the measuring part 2 are inserted into the second groove 325.

The first locking block 324 is provided with two bayonets 326. The rib 3, the core assembly 21 and/or the front end of the holder 1 inside the first casing 31 can be inserted into the bayonet 326 so that the second casing 32 can be positioned in the first casing 31 without displacement or rotation.

The front end of the holder 1 is provided with a holder screw hole 18 disposed opposite to the second casing 32. The second casing 32 is provided with a fifth through hole 329 penetrating through the second casing body 321 and disposed opposite to the holder screw hole 18. The present embodiment further includes a screw 38 threadedly connected to the holder screw hole 18 through the fifth through hole 329, and the screw 38 enables the second casing 32 to be fixed to the first casing 31 conveniently and quickly.

Figure 12:
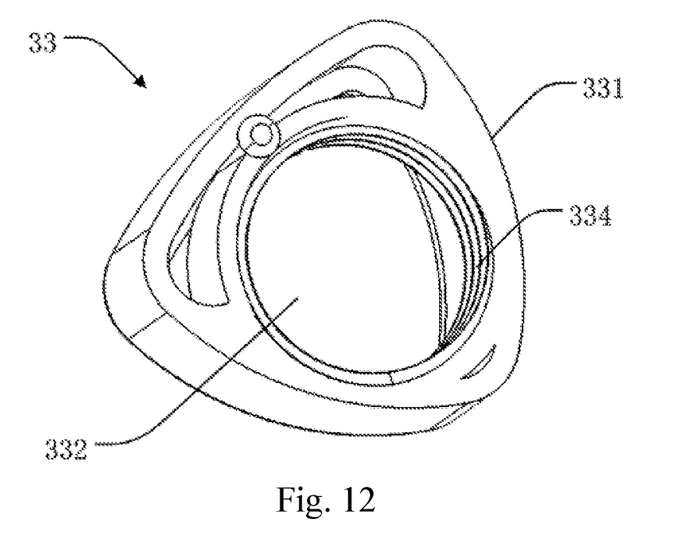
FIG. 12 is a structural diagram of a third casing in embodiment 1 of the present invention.
Figure 13:
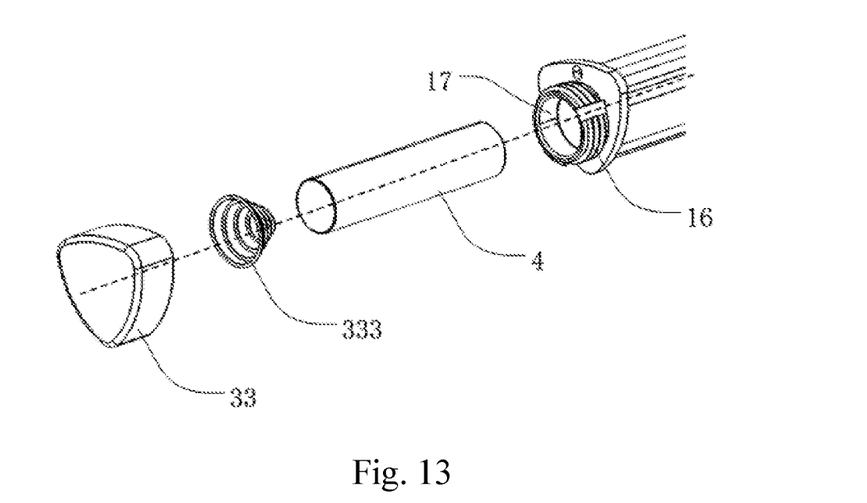
FIG. 13 is an exploded structural diagram of the third casing and the first casing in embodiment 1 of the present invention.

As shown in FIGS. 12-13, the third casing 33 includes a third casing body 331, a third groove 332, and an elastic member 333. The third groove 332 is disposed on one side of the third casing body 331 with a notch direction facing the first casing 31. The sizes of the inner diameter and outer diameter of the third casing 33 are the same as those of the first casing 31. The elastic member 333 is disposed on the bottom of the third groove 332. The elastic member 333 is a coil spring having different diameters at both ends, and is connected to the bottom of the third groove 332.

The third casing 33 is detachably connected to the holder 1. Preferably, the rear end of the holder 1 is provided with a protruding male connector 16 near the holder baffle 37. A female connector 334 is disposed at the notch of the third groove 332. The male connector 16 is threaded to the female connector 334. The male connector 16 is provided with a connector cavity 17 communicating with the second mounting groove 12. The battery 4 is inserted into the second mounting groove 12 by the connector cavity 17.

After the third casing 33 is connected to the holder 1, a smaller diameter end of the elastic member 333 is connected to the battery 4 in the second mounting groove 12 through the connector cavity 17, and the larger diameter end is fixed to the bottom of the third groove 332. The elastic member 333 is used to support the negative pole of the battery 4 such that the positive pole of the battery 4 is in close contact with the metal contact plate 121 to ensure good contact between the two ends of the battery 4. Since the metal ring 122 is electrically connected to the elastic member 333, the metal ring 122 is also connected to the negative pole of the battery 4.

In this embodiment, the holder 1 is elongated, the shape of the housing 3 is a straight cylinder, and the shape and size of two or more cross-sections of the housing 3 are the same. The cross-section is perpendicular to the central axis of the straight cylinder housing. The cross-section of the housing 3 is preferably a rounded triangle. In other embodiments, the cross-section of the housing 3 can also be a circle, an oval, a rounded rectangle or a rounded polygon. The round or rounded structure design makes the housing 3 convenient for the user to hold and enhance the hand feeling to prevent from slipping off from the user's hand. The material of the housing 3 is aluminum alloy, plastic, nylon material or carbon fiber material, which has the advantages of light weight, firmness and toughness, and low cost.

In this embodiment, the measuring part 2 and the display device 5 form a measurement display part, which is an important functional component. In order to ensure the laser ranging function and display effect, the measurement display part needs to occupy a larger space. The measuring part 2 employs a smaller size core assembly, preferably a small core assembly with a length of 39 mm, a width of 16 mm, a height of 10 mm. In the present invention, the cross-sectional height of the measurement display part is in a range of 10~12 mm; the cross-sectional width of the measurement display part is in a range of 15+17 mm; and the length of the measurement display part is in a range of 39~45 mm. The measurement display part can ensure the laser ranging function and the display effect within the above ranges of sizes, and ensure robust product functions.

In order to ensure product quality and thus ensure that it has a certain degree of firmness and anti-shock performance, the housing 3 need to have a certain thickness, and the housing 3 and the holder 1 must also maintain a certain gap therebetween.

The cross-sectional height of the housing 3 is in a range of 14~22 mm; and the cross-sectional width of the housing 3 is in a range of 18~25 mm. When the cross section of the housing 3 is circular, the diameter of the cross section of the housing 3 is in a range of 18~28 mm. When the cross section of the housing 3 is an oval, a rounded triangle, a rounded rectangle or a rounded polygon, the diameter of the inscribed circle of cross section of the housing 3 is in the range of 18~20 mm and the diameter of the circumscribed circle of the cross section of the housing 3 is in the range of 20~28 mm. When the battery is a button battery, the length of the housing 3 is in a range of 65~70 mm. When the battery 4 is a columnar battery, the length of the housing 3 is in a range of 95~140 mm. When the battery 4 is one columnar battery, the length of the housing 3 is 95 mm. When the battery 4 is two columnar batteries, the length of the housing 3 is 140 mm. When the housing 3 has a size within the above range, it can be ensured that the product has good anti-shock performance and hand feeling, and is easy to disassemble and assemble.

The ratio of the cross-sectional width of the measurement display part to the cross-sectional width of the housing 3 is in a range of 0.6~0.8; the ratio of the cross-sectional height of the measurement display part to the cross-sectional height of the housing 3 is in a range of 0.6~0.8; and the ratio of the cross-sectional area of the measurement display part to the cross-sectional area of the housing 3 is in a range of 0.67~0.8.

The measuring display part and the housing 3 can ensure the laser ranging function and the display effect within the above-mentioned size range, and ensure robust product functions. As a core component, the core assembly takes up less space, and the size of the housing cooperating therewith is also relatively small, so that the product as a whole can be as small as possible to reduce occupied space, making the product of the present invention easy to carry.

The laser ranging apparatus according to the present invention may further include a sheath 7 which may cover the outer surface of the housing 3 partially or entirely. Specifically, the sheath 7 may cover the outer surface of the first casing 31 partially or entirely; and/or cover the outer surface of the second casing 32 partially or entirely; and/or cover the outer surface of the third casing 33 partially or entirely. The sheath 7 is generally made of elastic material and can enhance the hand feeling, which is easy for users to hold and can prevent the laser ranging apparatus from slipping off. Even if a slippage occurs, since the housing 3 of the laser ranging apparatus is covered with the sheath 7, a certain buffering effect can also be provided to effectively prevent the product from being damaged. In this embodiment, the sheath is preferably provided outside the second casing 32, see FIG. 10.

The technical effect of this embodiment lies in that during the assembling process, the holder 1 is enabled to slide into the first casing 31 by using the ribs 311 and the groove 15 first, and then the second casing 32 is assembled to one end of the first casing 31 through the first locking block 324 and the second locking block 328, and the third casing 33 is threaded to the holder 1 at the other end of the first casing 31. The whole assembly process is easy and quick to operate. During disassembly, operations are performed in an inverse mode, i.e., the second casing 32 and the third casing 33 are removed from both ends of the first casing 31, the battery 4 is removed, and then the holder 1 is removed from the first casing. It is not necessary for the worker or the maintenance staff to touch the measuring part 2 during the entire disassembly and assembly process. The measuring part 2 is always fixed with the holder 1, so that the ranging precision of the measuring part 2 is always the same as the precision adjusted in the factory.

Another technical effect of this embodiment is that the main working components of the present embodiment, such as the measuring part 2, the battery 4, the display device 5 and the button switch 6, etc., are all fixedly mounted in the holder 1, and the housing 3 is only required to be support and fix the holder 1, no other parts are required to be supported and fixed by the housing 3. Therefore, compared with the prior art, the internal structure of the housing 3 is simplified. The housing 3 can be composed by several components with simple shapes. The overall manufacturing process of the housing 3 can also be simplified, which can reduce production costs, improve production efficiency, and increase productivity.

Another technical effect of this embodiment lies in that the overall size of the laser ranging apparatus according to the embodiment is small, the structure is compact, the portability is high, and the anti-shock performance and hand feeling are good.

Embodiment 2

Figure 14:
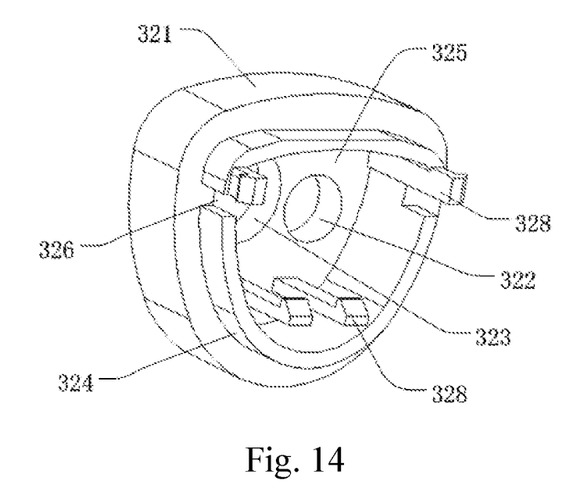
FIG. 14 is a structural diagram of the second casing in embodiment 2 of the present invention.
Figure 15:
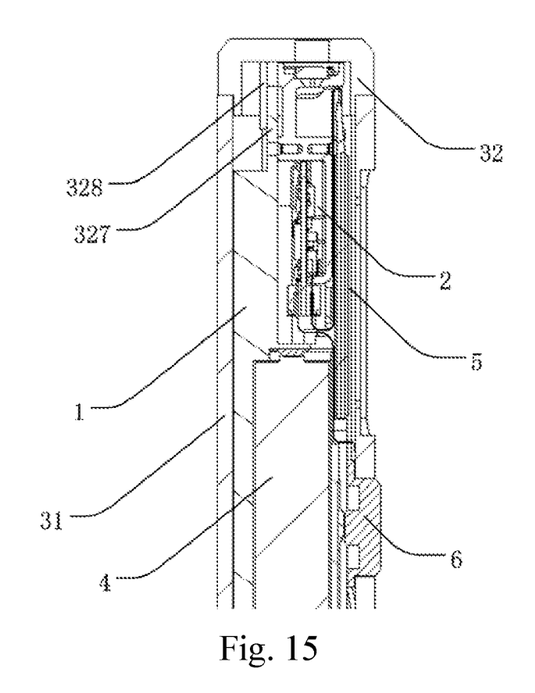
FIG. 15 is a cross-sectional view of a partial structure of embodiment 2 of the present invention.

As shown in FIGS. 14 to 15, the technical solution of this embodiment includes most of the technical features of embodiment 1, except that in embodiment 3, the second casing 32 does not include a screw structure but includes a first locking bock 324 and a second locking block 328.

The second casing 32 includes a first locking block 324 protruding from a surface of one side of the second casing body 321 and being locked inside the first opening 35 at the front end of the first casing 31. The shape of the cross-section of the outer wall of the first locking block 31 is adapted to that of the cross-section of the inner wall of the first casing 31. The first locking block 324 is made of elastic material, the second groove 325 is formed in a region surrounded by the first locking block and the second casing body 321, and the laser generating device 22 and the photoelectric conversion device 23 at the front end of the measuring part 2 are inserted into the second groove 325.

The first locking block 324 is provided with two bayonets 326. The front end of the holder 1 inside the first casing 31 can be inserted into the bayonet 326 so that the second casing 32 can be positioned on the first casing 31 without displacement or rotation.

One or more locking grooves 327 are provided on the inner sidewall of the front end of the first casing 31 or on the front end of the holder 1. One or more second locking blocks 328 are provided and protruded from a surface of one side of the second casing body 321. The second locking blocks 328 are respectively locked into each groove 327. The first locking block 324 and the second locking block 328 cooperate with each other to detachably connect the second casing to the first opening 35 of the first casing 31.

Other technical features of this embodiment are the same as those in embodiment 1, and details are not described herein again.

The technical effect of this embodiment is to provide another new housing connection manner so that the second casing 32 and the first casing 31 can be easily and quickly removed or assembled without tools, and the structure of the second casing 32 can be further simplified, processing difficulty can be further reduced, and production process can be simplified.

Embodiment 3

Figure 16:
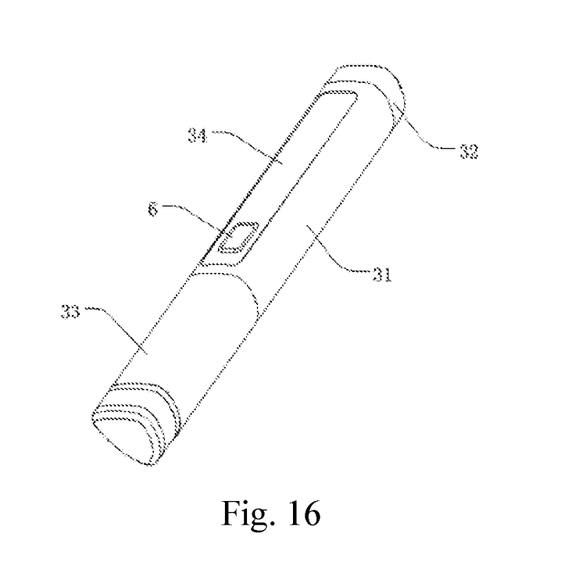
FIG. 16 is a schematic diagram of an overall structure of embodiment 3 of the present invention.
Figure 17:
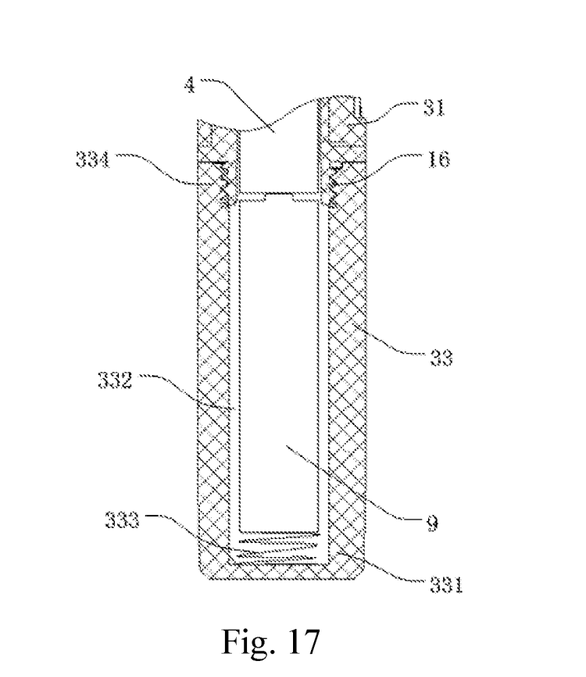
FIG. 17 is a schematic cross-sectional view of a partial structure in embodiment 3 of the present invention.

As shown in FIGS. 16 to 17, the technical solution of this embodiment includes most of the technical features of embodiment 1. The difference therebetween lies in that, in embodiment 4, the depth of the third groove 332 is larger, and thus one or more batteries can be additionally added and connected in series with the battery 4 in the second mounting groove 12.

The third casing 33 includes a third casing body 331, a third groove 332, and an elastic member 333. The third groove 331 is disposed on one side of the third casing body 331 with a notch direction facing the first casing 31. The sizes of the inner diameter and the outer diameter of the third groove 331 are the same as those of the first casing 31.

In this embodiment, the battery 4 in the second mounting groove 12 may be a single battery, or may be two or more batteries connected in series with each other. Further, the present embodiment further includes a second battery 8 detachably installed in the third groove 332. One end of the second battery 8 (positive pole) is connected in series to the battery 4 in the holder 1, and the other end (negative pole) is connected to the elastic member 333. The second battery 8 may be a single battery, or a battery pack having two or more batteries connected in series with each other. In this embodiment, the second battery 8 is preferably a columnar battery. In other embodiments, the second battery 8 may also be one or more button batteries.

The elastic member 333 is disposed at the bottom of the third groove 332. The elastic member 333 is a coil spring having different diameters at both ends. One end with a larger diameter is connected to the bottom of the third groove 332, while another end with a smaller diameter is connected to the second battery 8. In other embodiments, the elastic member 333 may also be a coil spring having the same diameter at both ends.

The rear end of the holder 1 is provided with a protruding male connector 16. A female connector 334 is disposed at the notch of the third groove 332. The male connector 16 is detachably connected to the female connector 334. In this embodiment, a set of threads are provided on the outer sidewall of the male connector 16, and also a set of threads are provided on the inner sidewall of the female connector 334. The two sets of threads have corresponding shapes and sizes, and the male connector 16 can be threaded into the female connector 334. In other embodiments, the male connector 16 and the female connector 334 may be connected to one another using other removable structures.

The male connector 16 is in-built with a connector cavity 17, one end of the male connector 16 is connected to the second mounting groove 12, and the other end of the male connector 16 is connected to the third groove 332. The second mounting groove 12, the connector cavity 17 and the third groove 332 are located on the same straight line and communicate with each other, so that the three become a complete battery mounting groove. A plurality of batteries can be connected from end to end in series with each other. After the third casing 33 is connected to the first casing 31, the second battery 8 is connected to the battery 4 in the second mounting groove 12 through the connector cavity 17.

After the third casing 33 is connected to the first casing 31, the elastic member 333 is used to support the negative pole of the second battery 8 so that the positive pole of the battery 4 is in close contact with the metal contact 121, and the negative pole of the second battery 8 and the elastic member 333 are closely connected to ensure that both ends of the entire battery pack are in good contact. Since the metal ring 122 is electrically connected to the elastic member 333, the metal ring 122 is also connected to the negative pole of the second battery 8.

The technical effect of the present embodiment is to provide a solution for disposing a battery in the third casing 33 so as to reduce the length of the first casing 31, reduce the processing difficulty and simplify the manufacturing process. At the same time, in the present embodiment, a plurality of batteries can be simultaneously arranged, which can be applied to a high-power laser ranging apparatus and enhance the hand feeling, which is suitable for more situations.

The above is only the preferred embodiments of the present invention, and those skilled in the art may make improvements and modifications to the above technical solutions without departing from the principle of the present invention, and these improvements and modifications should also be regarded as the scope of the present invention.

The invention claimed is:

1. A laser ranging apparatus, comprising:
a holder;
a measuring part mounted to said holder; and
a housing detachably connected to said holder;
wherein said housing includes a first casing, and the first casing is an integrally formed tubular structure detachably sleeved outside said holder;
wherein said housing further comprises a second casing and a third casing respectively detachably connected to two ends of said first casing;
wherein said second casing includes:
a first locking block protruding from a surface of one side of said second casing body and being locked into the first opening of said first casing;
a bayonet provided on said first locking block, one end of the rib of said first casing being detachably locked into said bayonet; and
a second groove surrounded and formed by said first locking block and said second casing body, a front end of said measuring part being inserted into said second groove.

2. The laser ranging apparatus according to claim 1, wherein
both ends of said first casing are respectively provided with a first opening and a second opening;
said second casing is detachably mounted to said first opening of said first casing; and
one end of said holder is inserted into said first casing via said second opening, the other end of said holder extends to the outside of said second opening, and said holder is detachably connected to said third casing.

3. The laser ranging apparatus according to claim 1, further comprising:
a groove provided on an outer sidewall of said holder; and
a rib protruding from an inner sidewall of said first casing and slidably inserted into said groove.

4. The laser ranging apparatus according to claim 1, wherein
the shape of said holder is elongated, and the shape of said housing is a straight cylinder.

5. The laser ranging apparatus according to claim 1, wherein said holder comprises:
a first mounting groove disposed opposite to said second casing; and
a second mounting groove disposed opposite to said third casing.

6. The laser ranging apparatus according to claim 1, further comprising:
a display device mounted to said holder; and
a button switch mounted to said holder;
wherein said display device and said button switch are connected to said measuring part and/or at least one battery through wires.

7. The laser ranging apparatus according to claim 6, wherein
said holder includes:
a third mounting groove recessed on a sidewall of said holder for mounting said display device; and
a fourth mounting groove recessed on a sidewall of said holder for installing said button switch; and said first casing includes:
a first casing body;
a first groove recessed on a surface of one side of said first casing body;
a first through hole penetrating through a bottom surface of said first groove and disposed opposite to said display device; and
a second through hole penetrating the bottom surface of said first groove and being penetrated by a portion of said button switch.

8. The laser ranging apparatus according to claim 7, further comprising:
a transparent cover mounted in said first groove and having a portion disposed opposite to said first through hole; and
a cover through hole penetrating through one end of said transparent cover and disposed opposite to said second through hole; and
said second through hole and said cover through hole being sequentially penetrated by a portion of said button switch.

9. The laser ranging apparatus according to claim 1, wherein
said measuring part includes:
a laser generating device having a first laser port facing the first opening of said first casing; and
a photoelectric conversion device having a second laser port facing the first opening of said first casing; and
said second casing includes:
a second casing body;
a third through hole penetrating through said second casing body and disposed opposite to said first laser port; and
a fourth through hole penetrating through said second casing body and disposed opposite to said second laser port.

10. The laser ranging apparatus according to claim 1, further comprising:
a holder screw hole provided at a front end of said holder and disposed opposite to said second casing;
a fifth through hole penetrating through said second casing body and disposed opposite to said holder screw hole; and
a screw connected to said holder screw hole through said fifth through hole.

11. The laser ranging apparatus according to claim 1, further comprising:
a locking groove provided on an inner sidewall of a front end of said first casing or the front end of said holder; and
a second locking block protruding from a surface of one side of said second casing body and locked into said locking groove.

12. The laser ranging apparatus according to claim 1, wherein said third casing includes:
a third casing body;
a third groove disposed at one side of said third casing body with a notch direction facing the said first casing; and
an elastic member having one end connected to said bottom of said third groove and the other end connected to a battery in said holder.

13. The laser ranging apparatus according to claim 12, further comprising:
a female connector provided at the notch of said third groove;

a male connector protruding from one end of said holder and detachably connected to said female connector; and a connector cavity disposed in said male connector and communicating with said second mounting groove.

14. The laser ranging apparatus according to claim 1, wherein said third casing includes:

a third casing body;

a third groove provided at one side of said third casing body with a notch direction facing said first casing;

a second battery detachably mounted in said third groove having one end connected in series to the battery in said holder; and an elastic member having one end connected to the bottom of said third groove and the other end connected to said second battery.

15. The laser ranging apparatus according to claim 14, further comprising:

a female connector provided at the notch of said third groove;

a male connector protruding from one end of said holder and detachably connected to said female connector; and a connector cavity disposed in said male connector and communicating with said second mounting groove.

16. The laser ranging apparatus of claim 1, further comprising:

a sheath covering an outer surface of said housing partially or entirely.

* * * * *